United States Patent [19]
Reese et al.

[11] Patent Number: 5,662,439
[45] Date of Patent: Sep. 2, 1997

[54] COMPOUND APPLICATION APPARATUS AND METHOD FOR GEAR TESTING MACHINE

[75] Inventors: John L. Reese, Farmington; Kim R. Hancock, Rochester, both of N.Y.

[73] Assignee: The Gleason Works, Rochester, N.Y.

[21] Appl. No.: 670,922

[22] Filed: Jun. 26, 1996

Related U.S. Application Data

[60] Provisional application No. 60/000,586 Jun. 28, 1995.

[51] Int. Cl.$^6$ .................................................. B23Q 17/20
[52] U.S. Cl. .............................. 409/61; 409/1; 33/501.7; 33/501.13; 73/162
[58] Field of Search ................. 409/61, 133; 73/162; 33/501.7, 501.13

[56] References Cited

U.S. PATENT DOCUMENTS

| | | | |
|---|---|---|---|
| 4,261,198 | 4/1981 | Moore | 73/162 |
| 4,276,700 | 7/1981 | Tanno et al. | 33/179.5 R |
| 4,337,580 | 7/1982 | Tanno et al. | 33/179.5 R |
| 5,083,458 | 1/1992 | DeGeorge et al. | 73/162 |
| 5,373,735 | 12/1994 | Gutman | 73/162 |
| 5,511,414 | 4/1996 | Nakamura et al. | 73/162 |

FOREIGN PATENT DOCUMENTS

| | | | |
|---|---|---|---|
| 1-233306 | 9/1989 | Japan | 33/501.7 |
| 3-100435 | 4/1991 | Japan | 73/162 |
| 3-100434 | 4/1991 | Japan | 73/162 |
| 4-36632 | 2/1992 | Japan | 73/162 |
| 2141055 | 12/1984 | United Kingdom . | |

*Primary Examiner*—Daniel W. Howell
*Assistant Examiner*—Christopher Kirkman
*Attorney, Agent, or Firm*—Robert L. McDowell; Ralph E. Harper

[57] ABSTRACT

An apparatus (40) for applying marking compound to the tooth surfaces of a gear or pinion member (14). The apparatus comprises a brush (42) having a central shaft (82) and a plurality of bristles (44) emanating from the shaft (82) with the brush (42) being rotatable about an axis of rotation coincident with the shaft (82). The apparatus also includes a cover plate (49) and a marking compound manifold (48) adjacent to the brush (42) comprising an inlet (92) in a first side of the manifold (48), an inner distribution chamber (94) communicating with the inlet (92), and a plurality of outlets (96) in a second side of the manifold (48) communicating with the inner chamber (94), the outlets (96) facing the bristles (44) of the brush (42). The apparatus (40) further includes means (52, 54) to move the brush (42) and manifold (48) from a first position remote from the gear or pinion (14) to a second position wherein the bristles (44) engage the tooth surfaces of the gear or pinion (14). The brush (42) is rotated by engaging the bristles (44) with the tooth surfaces of the gear or pinion member (14) and rotating the engaged gear or pinion member (14) about its respective axis. The apparatus (40) may further include a movable splash guard (98) to protect the brush (42) from contamination when the apparatus (40) is in the first position.

19 Claims, 9 Drawing Sheets

COMPOUND APPLICATION APPARATUS AND METHOD FOR GEAR TESTING MACHINE

This application is a continuation of provisional application Ser. No. 60,000,586 filed on Jun. 28, 1995 now abandoned.

FIELD OF THE INVENTION

The present invention is directed generally to testing machines for toothed articles and in particular to a system for applying marking compound to a gear member mounted on a gear testing machine.

BACKGROUND OF THE INVENTION

There are many testing procedures known for evaluating bevel and cylindrical gears. Among these testing procedures are single flank and double flank analysis, noise and vibration testing, and, tooth contact analysis.

In tooth contact analysis, a marking compound, usually consisting of a fine chalk powder suspended in a carrier substance such as oil, is applied to the tooth surfaces of one member of a gear pair, such as the gear member of a bevel gear pair, and the pair is then run in mesh usually under a light load. The marking compound is removed from the areas of the gear tooth surfaces which contact the tooth surfaces of the mating pinion member of the gear set. The marking compound is transferred to the pinion tooth surfaces leaving a "footprint" of the contact region visible on the gear tooth surface.

In the prior art, marking compound has primarily been applied to tooth surfaces by two methods, manual brushing or spraying. In the manual brushing method, marking compound is hand brushed onto tooth surfaces. While hand brushing produces an adequate coating, this procedure is very time consuming. Also with hand brushing, gear-to-gear consistency of coating is difficult to maintain.

Spraying methods and systems, such as shown in U.S. Pat. No. 5,373,735 to Gutman for example, are relatively fast and provide a more even coating of tooth surfaces. However, spraying also results in marking compound being sprayed onto other machine components in the testing machine chamber as well a contaminating mist being formed in the atmosphere of the testing chamber and thus a mist collector is usually required to meet environmental standards.

Another disadvantage of spraying is the necessity of utilizing a carrier oil having a low viscosity in order to perform the spraying process. The higher the viscosity of the carrier oil, the thicker it is and the more difficulty it presents in flowing through the spraying mechanism. However, while lower viscosity oils flow adequately through the spraying mechanism, the thin consistency of the oil promotes a marking compound that does not adhere well to the tooth surfaces but instead tends to run down the tooth surface and may result in producing a smeared tooth contact pattern.

Yet a further disadvantage of spraying, and also hand brushing to a lesser extent, is that a gear set which has been roll tested previous to the application of marking compound, as is common, will likely have oil on the tooth surfaces as a result of the roll test. Spraying marking compound on these oily tooth surfaces will lead to further thinning of the marking compound due to the oil on the tooth surfaces mixing with the carrier oil of the marking compound. While hand brushing enables the use of a higher viscosity carrier oil than in spraying processes, the consistency of the marking compound is still adversely affected by the presence of oil on the tooth surfaces.

Prior to the application of marking compound, residual oil on the tooth surfaces may be removed. One popular method if to utilize a high pressure air spray to blow oil off the tooth surfaces. While this procedure does remove some oil, a coating of oil on the tooth surfaces still remains. Another procedure is to remove and wash the gear which results in all oil being removed but this method is very time consuming and does not fit well into production line situations.

Thus, there remains a need to provide a marking compound application system free of the disadvantages of the prior art methods discussed above. Therefore, it is an object of the present invention to provide a marking compound application system and method which retains rapidity of application and consistency of coating while confining application of marking compound to tooth surfaces and enabling the testing chamber atmosphere to remain free of marking compound mist contamination. With the present invention, the need and expense of a mist collector system to capture marking compound from a contaminated atmosphere is avoided.

It is another object of the present invention to provide a consistent gear-to-gear coating and to enable marking compound to be applied to tooth surfaces even in the presence of residual oil from a previous process.

SUMMARY OF THE INVENTION

The present invention is directed to an apparatus for applying marking compound to the tooth surfaces of a gear or pinion member.

The apparatus comprises a brush having a central shaft and a plurality of bristles emanating from the shaft with the brush being rotatable about an axis of rotation coincident with the shaft.

The apparatus also includes a marking compound manifold adjacent to the brush. The manifold comprises an inlet in a first side of the manifold, an inner distribution chamber communicating with the inlet, and a plurality of outlets in a second side of the manifold communicating with the inner chamber, the outlets facing the bristles of the brush.

The apparatus further includes a cover plate positioned over a portion of the periphery of the brush and means to move the brush and manifold from a first position remote from the gear or pinion to a second position wherein the bristles engage the tooth surfaces of the gear or pinion.

The brush is rotated by engaging the bristles with the tooth surfaces of the gear or pinion member and rotating the engaged gear or pinion member about its respective axis. Marking compound is supplied to the outlets of the manifold where it is taken up by the sweeping action of the rotating brush and applied to the tooth surfaces.

The apparatus may additionally include a splash guard to protect the brush from contamination due to other testing procedures when in the remote position.

DETAILED DESCRIPTION OF THE PREFERRED EMBODIMENTS

The preferred embodiments of the present invention will be discussed with reference to the accompanying drawings.

Figure 1:
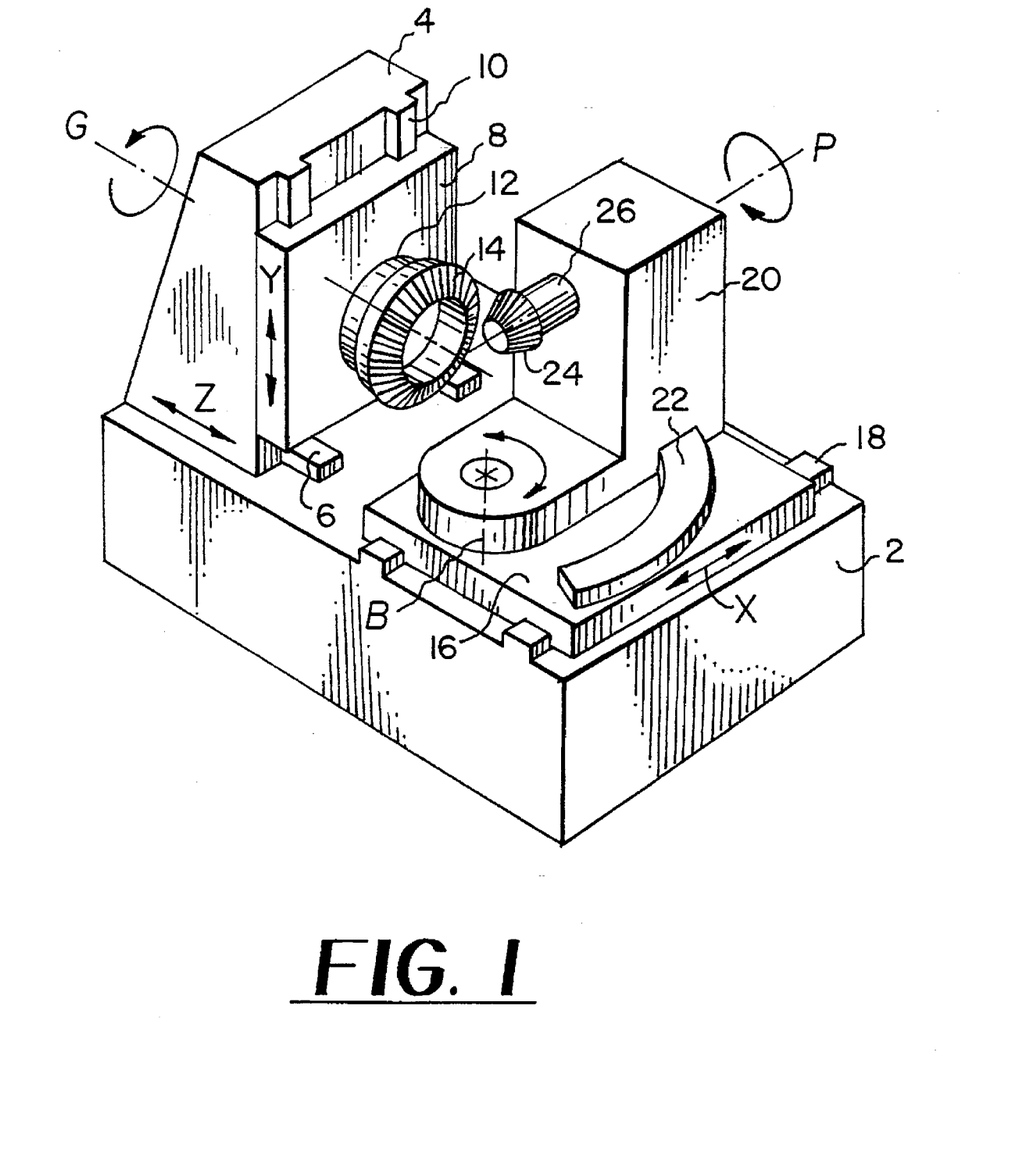
FIG. 1 is a schematic representation of one type of gear testing machine.

FIG. 1 schematically illustrates a known type of gear testing machine. For illustrative purposes only, the present invention will be discussed with reference to this type of testing machine. However, it is to be understood that the present invention may be utilized with any type of gear testing machine.

The gear testing machine of FIG. 1 comprises a machine base 2 and a gear column 4 movable along the length (Z-axis) of machine base 2 via ways 6. A gear head 8 is mounted for vertical movement (Y-axis) via ways 10 on gear column 4. Positioned for rotation in gear head 8 is a spindle 12 to which a gear member 14 is removably mounted for rotation about its axis (G-axis).

Also positioned on machine base 2 is pinion slide 16 movable along the width (X-axis) of the machine base 2 via ways 18. A pinion column 20 is mounted for arcuate movement on slide 16, via way 22, about an axis perpendicular to the machine base 2 (B-axis). A mating pinion member 24 is removably mounted to a pinion spindle 26 for rotation about a pinion axis (P-axis).

With the machine of FIG. 1, hypoid offset (Y-axis), pinion cone (X-axis), gear cone (Z-axis), and, shaft angle (B-axis) can be controlled. The arcuate motion of the pinion column 20 allows for shaft angle adjustments between zero and ninety degrees and enables testing of bevel or cylindrical gears.

Movement of the gear column 4, gear head 8, pinion slide 16, pinion column 20, as well as the gear spindle 12 and pinion spindle 26 is imparted by separate drive motors and the above-named components are capable of independent movement with respect to one another or may move simultaneously with one another. Each of the drive motors is associated a feedback device such as a linear or rotary encoder as part of a computer numerical control (CNC) system which governs the operation of the drive motors in accordance with instructions input to a computer controller. CNC systems are well known in the art.

Figure 2:
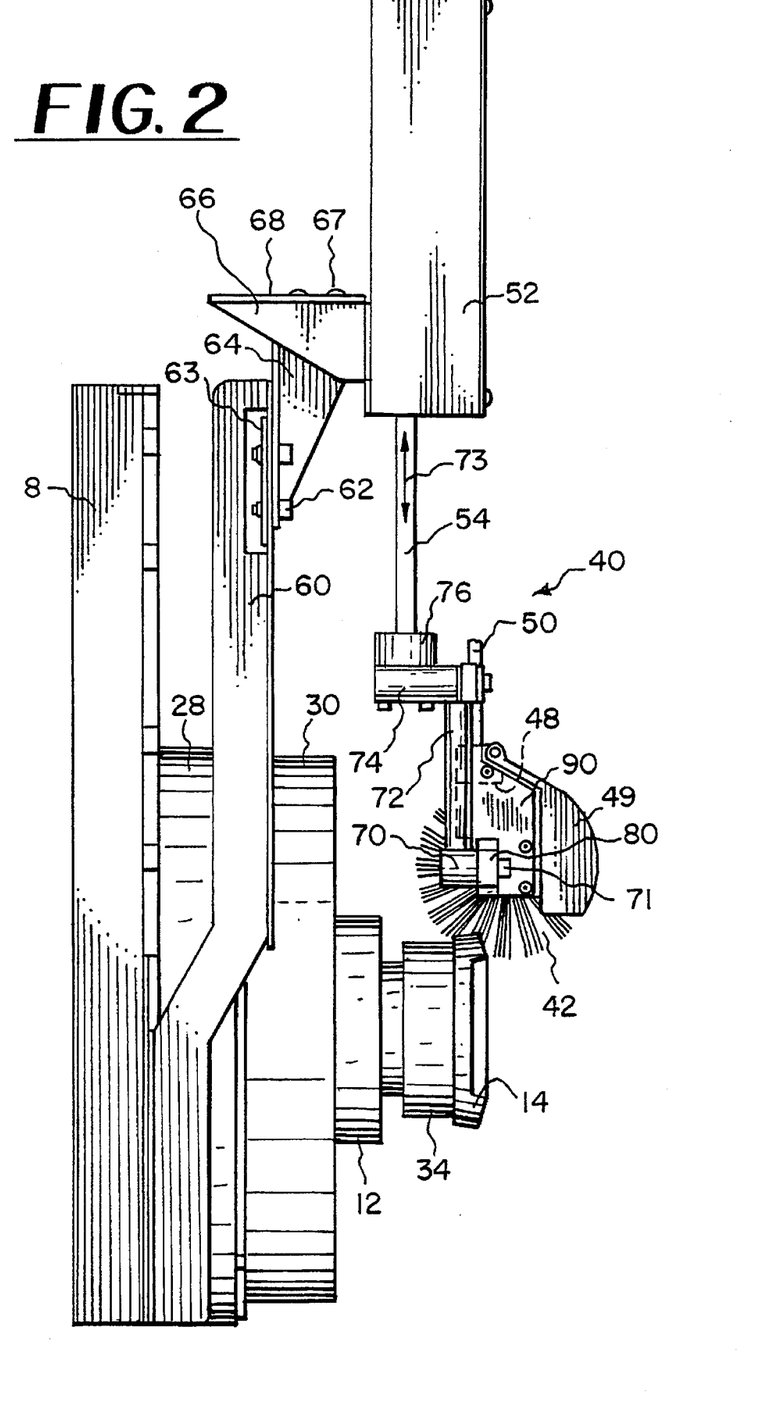
FIG. 2 is a side view of the marking compound application apparatus of the present invention the operating position.

FIG. 2 shows a side view of the marking compound application apparatus 40 of the present invention mounted to gear head 8 of FIG. 1. While the compound application system is shown mounted to gear head 8, this has been shown for illustrative purposes only and it must be emphasized that the inventive application system could be mounted to pinion column 20 or to any other appropriate machine component which would allow it to be positioned in a manner to apply marking compound to the gear or pinion member. The gear head 8 includes a spindle housing having an inner portion 28 and outer portion 30 and a spindle 12 suitably mounted for rotation within the housing. Gear member 14 is mounted to the spindle 12 via appropriate work holding equipment, such as a collet 34.

Figure 4:
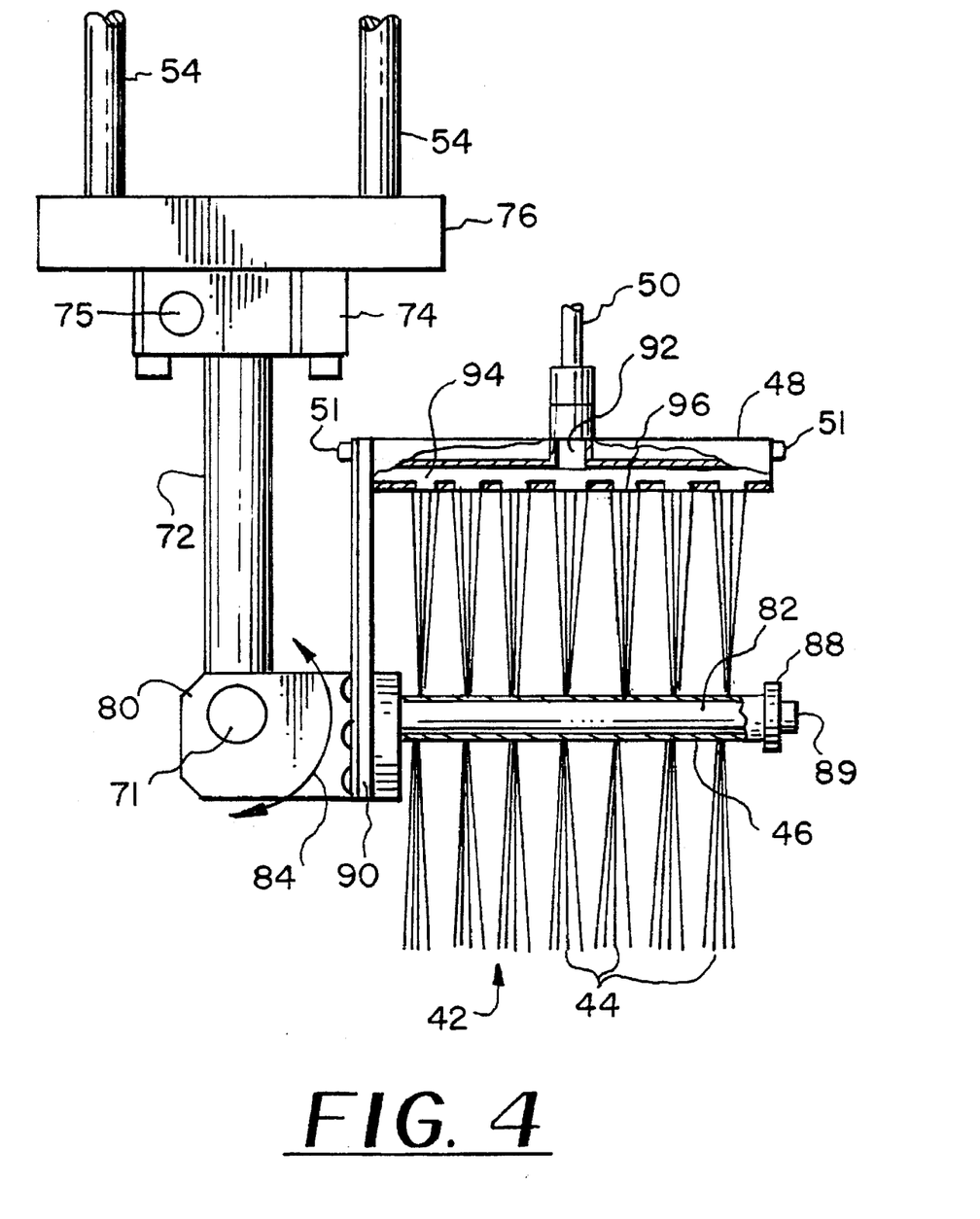
FIG. 4 is an axial cross-sectional view of the brush assembly of the present invention.

The marking compound application system 40 of the present invention comprises a rotatable brush 42 having bristles 44 emanating from a hollow shaft 46 (FIG. 4). The brush 42 is positioned and rotatable about a mounting shaft 82. Located adjacent brush 42 is a marking compound supply manifold 48 which receives marking compound from a source, such as a pump 51 (FIG. 6), via supply pipe 50, for delivery to brush 42. Preferably supply pipe 50 comprises flexible tubing, at least at appropriate locations, to allow for any movement of testing machine components or adjustments to the position of the compound application system during mounting or when gear and/or pinion members of different sizes are tested. If desired, supply pipe 50 may be a single continuous tube or may exist in sections joined by couplings 53 secured to compound supply system mounting brackets (discussed below). Preferably, a portion of the periphery of the brush 42 is covered by a cover plate 49 which may be hinged to the manifold 48 such as at 51.

Figure 6:
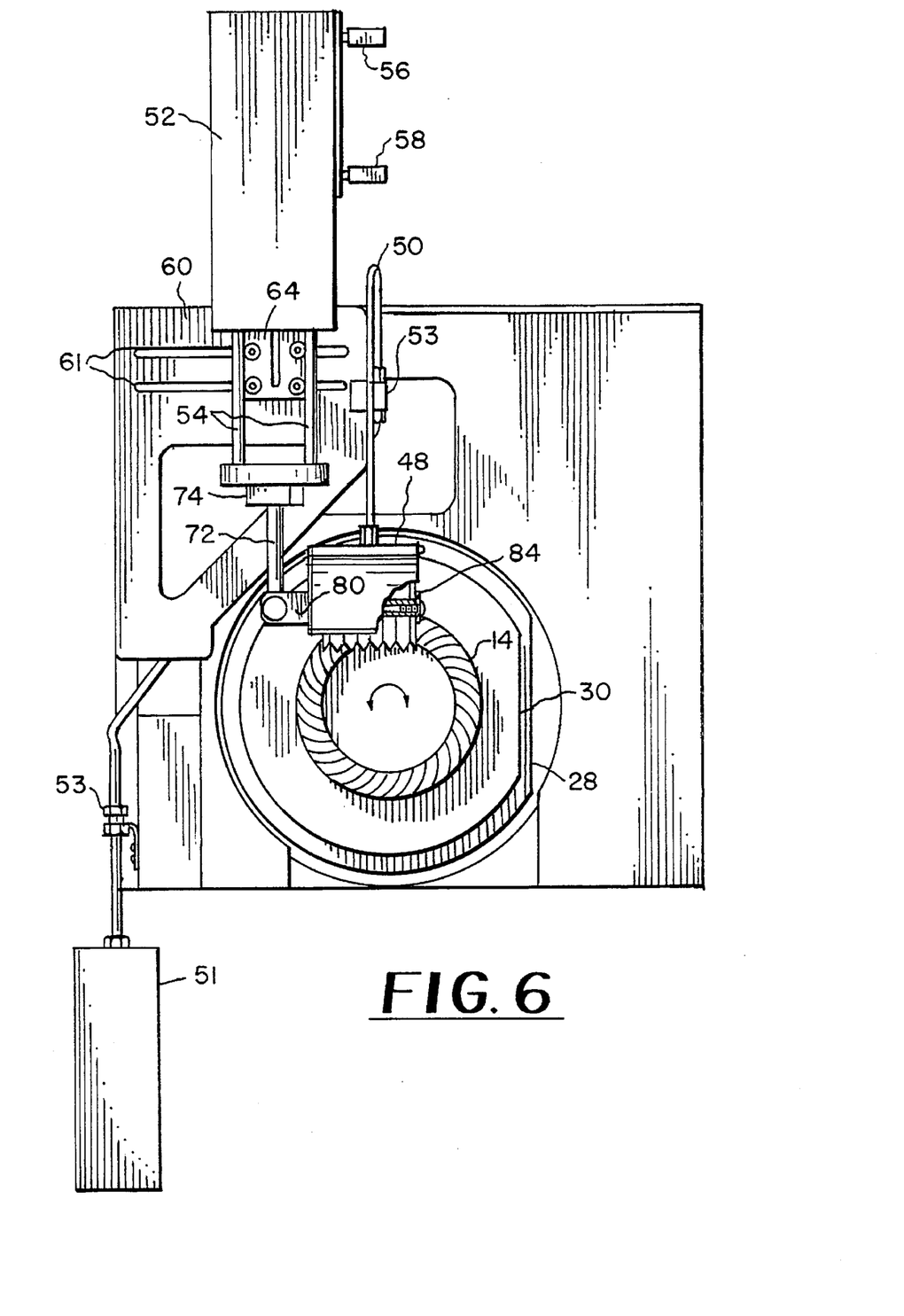
FIG. 6 is a scaled-down front view of the inventive marking compound application apparatus in the operating position.

The compound application system 40 is movable vertically as shown by arrow 73 between a working position (FIG. 2) where it is engaged with the gear member 14 and a position remote from the gear member (FIG. 3) by a piston 52 and slides 54. Piston 52 may be actuated by any suitable means such as air or hydraulic fluid and the upper and lower travel limits of slides 54 are controlled by respective limit switches 56 and 58 (FIG. 6). While vertical movement between the working and remote positions has been illustrated, the remote position may be oriented in any direction with respect to the gear or pinion member.

Figure 7:
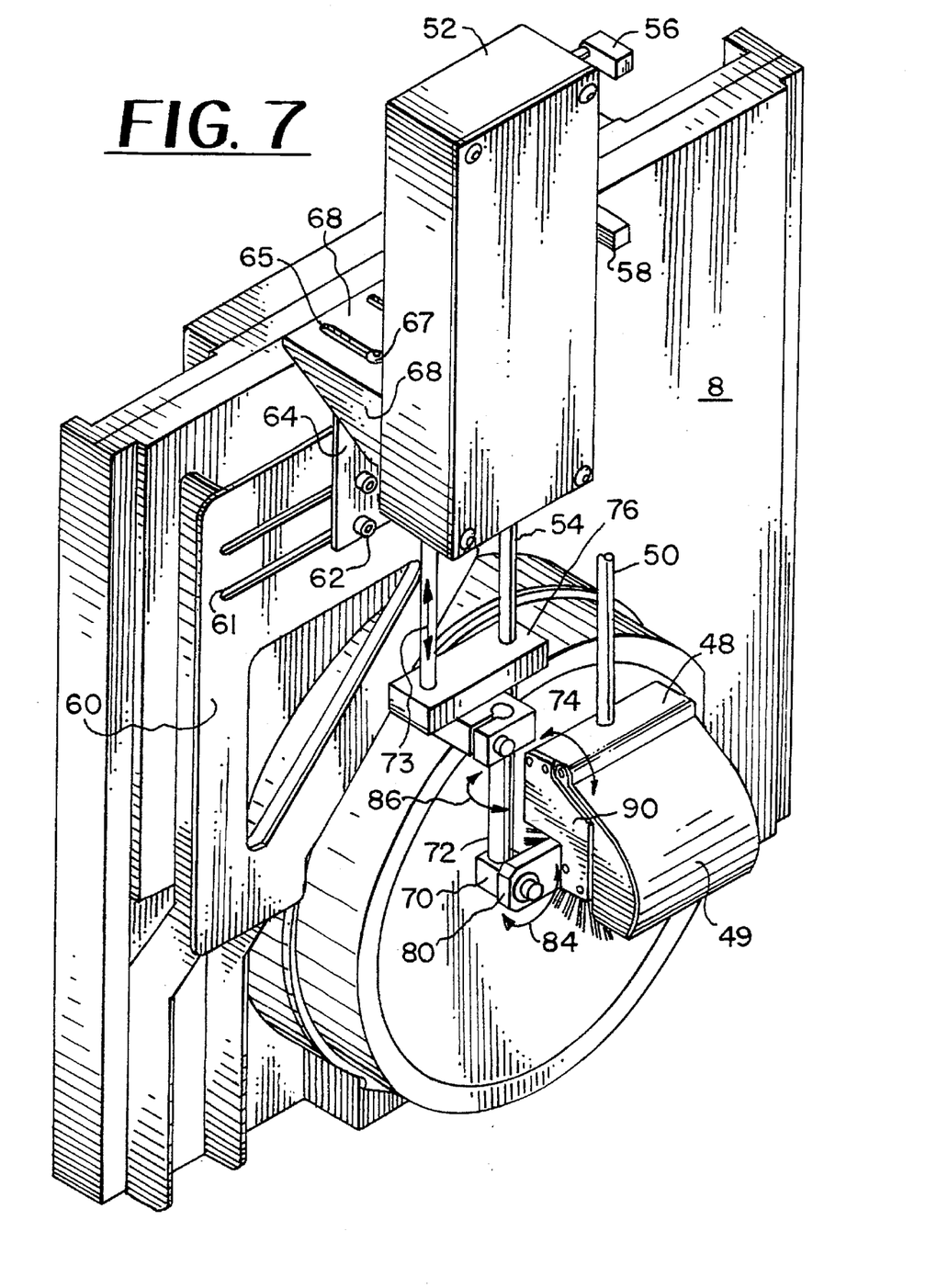
FIG. 7 is a perspective view of the marking compound application apparatus in the operating position.

The marking compound application system 40 is secured to the testing machine, and specifically to gear column 8, by a plate 60 and brackets 64 and 68. Plate 60 is secured to gear head 8 and includes horizontally extending slots 61 (FIGS. 6 and 7) for positioning system 40 along the width of the gear head 8. Screws 62 pass through the slots 61 and threadably engage clamping plate 63 for securing bracket 64 to gear head 8. Attached to the top plate 66 of bracket 64 is bracket 68 which is secured to piston 52 and which also includes horizontally extending slots 65 for positioning system 40 perpendicularly with respect to gear head 8. Screws 67 pass through slots 65 and threadably engage top plate 66 for securing bracket 68 to bracket 64.

Brush 42 is connected to piston 52 and slides 54 via lower block 70 (FIG. 2), rod 72, and upper block 74 which is secured to plate 76 attached to the lower ends of slides 54. Lower block 70 and rod 72 is preferably a one-piece unit but may be separate components attached by any suitable means. Mounting shaft 82 is integral with L-shaped mounting bracket 80 which is secured to block 70 by screw 71 and is pivotable about an axis passing through screw 71 (parallel to gear axis G) for effectively angularly adjusting the position of brush 42, as shown by arrow 84 in FIG. 7, about gear axis G. The upper end of rod 72 is secured in upper block 74 by screw 75. Loosening the screw 75 allows rod 72 to be rotated about its axis (perpendicular to gear axis G and the machine base or parallel to direction 73) in the direction shown by arrow 86 for angularly adjusting the brush 42 pivotally toward or away from the gear member 14.

FIG. 4 shows an enlarged view of an axial cross-section of the brush 42 and compound supply manifold 48. Brush 42 is free to rotate on mounting shaft 82 and is held in place by retaining washer 88 and screw 89 which threadably engages the end of mounting shaft 82. Attached to mounting bracket 80 is manifold mounting plate 90 to which is secured compound supply manifold 48. Mounting plate 90 and manifold 48 may be secured by any suitable means such as screws for example.

Marking compound supply manifold 48 comprises an inlet 92 in a first side of the manifold and is connected to supply tube 50. Supply manifold 48 further includes an inner distribution chamber 94 and a plurality of outlets 96 in a second side of the manifold 48 facing the bristles 44 and preferably arranged along the second surface of the manifold 48 in a direction parallel to the shaft 46 of brush 42. The diameter of the outlets 96 may be of any dimension suitable to provide an adequate flow of compound onto the brush 42 with an outlet diameter of about 0.050 inch (1.270 mm) being preferred.

In situations where the particular marking compound is quite viscous it may be found that flow of the marking compound to the extreme outer and inner outlets 96 of distribution chamber 94 is difficult even under high pressures. In this instance, the outlet diameter of the outlets adjacent to inlet 92 may be smaller than that of the more distant inner and outer outlets, such as, for example, inner outlets having a diameter of about 0.050 inch (1.270 mm) with the more distant outlets having an outlet diameter of about 0.060 inch (1.524 mm). This arrangement has the effect of providing more resistance to the flow of marking compound through the smaller diameter outlets thus effecting a greater amount of marking compound being provided to the outer larger diameter outlets which are less resistant to flow due to their larger diameters.

The manifold 48 is positioned with respect to the brush 42 such that upon rotation of the brush, bristles 44 will sweep across, or preferably just below, the surface of the manifold 48 comprising outlets 96 to pick-up marking compound that has been introduced into chamber 94 via tube 50 and inlet 92. Cover plate 49 rests on brush bristles 44 and serves to assist in distributing marking compound over the bristles by allowing marking compound picked up by bristles 44 to be spread across the inside surface of cover plate 49 and hence be more evenly distributed over all bristles 44.

If desired, in order to adapt supply manifold 48 to brushes of differing lengths, a plug may be inserted into the inner distribution chamber 94 preferably from the first side of the manifold 48 at an appropriate location along the length of the manifold 48. This will block-off access to marking compound to that portion of the distribution chamber 94 beyond the plug. By varying the location of the plug along the length of the manifold 48, the working length of the manifold may be controlled to correspond to the length of the particular brush 42 being used to apply marking compound to a workpiece. Alternatively, any number of individual outlets 96 may be plugged to control the number of outlets through which marking compound may flow thus adapting the length of distribution chamber 96 to correspond to the length of brush 42.

Figure 5:
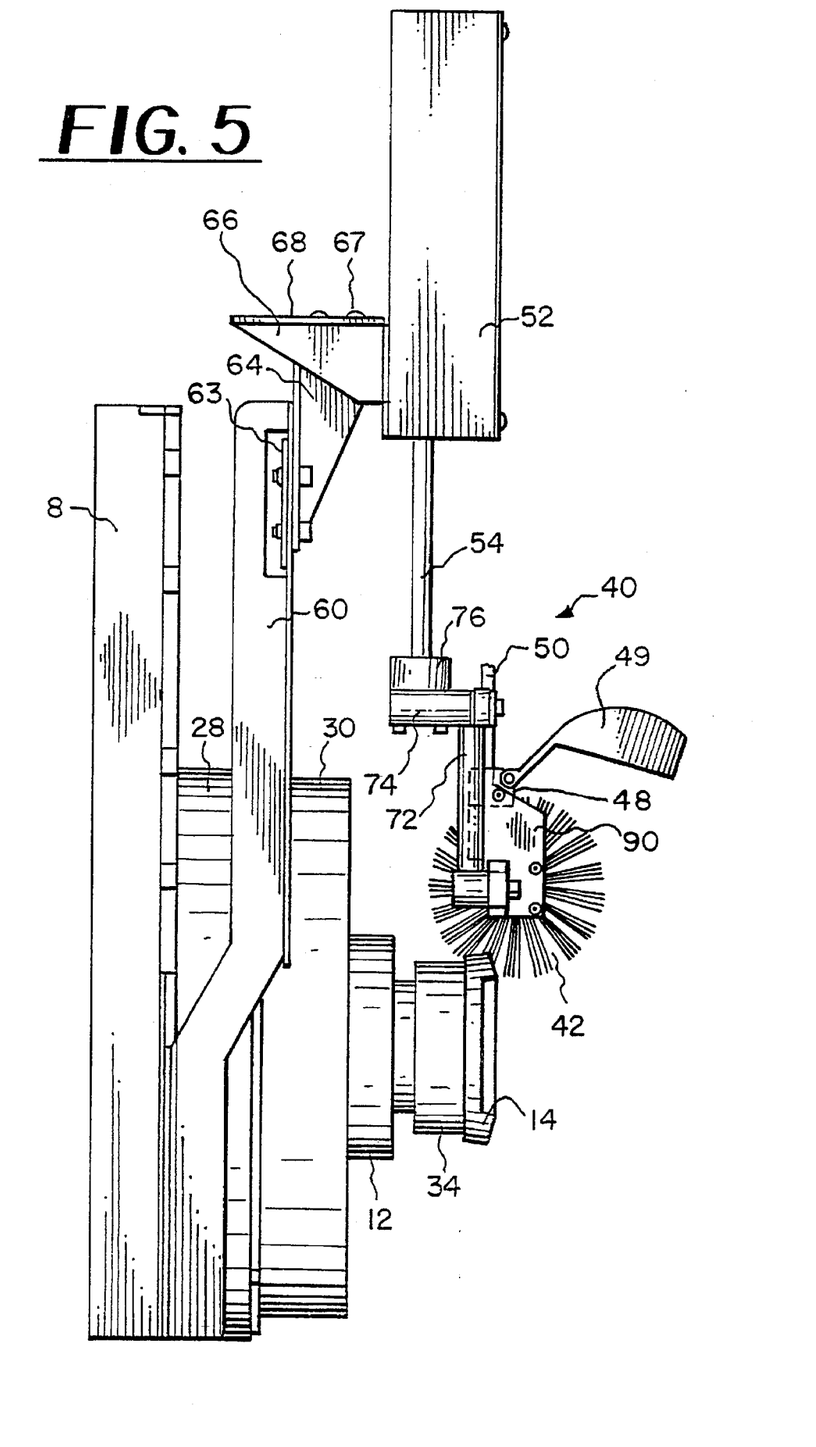
FIG. 5 is a side view of the marking compound application apparatus of the present invention illustrating the hinged brush cover plate.

The brush 42 is easily replaced by removing screw 89 and retaining washer 88 and sliding brush 42 from mounting shaft 82. Cover plate 49 may be raised (FIG. 5) to assist in removing brush 42. Brush 42 may be of any suitable diameter (4 inch or 5 inch in diameter, for example) depending on the tooth depth of gear member, however, different lengths of manifold mounting plate 90 may have to be utilized to accommodate differing brush diameters in order to correctly position compound supply manifold 48 with respect to the brush 42.

Figure 3:
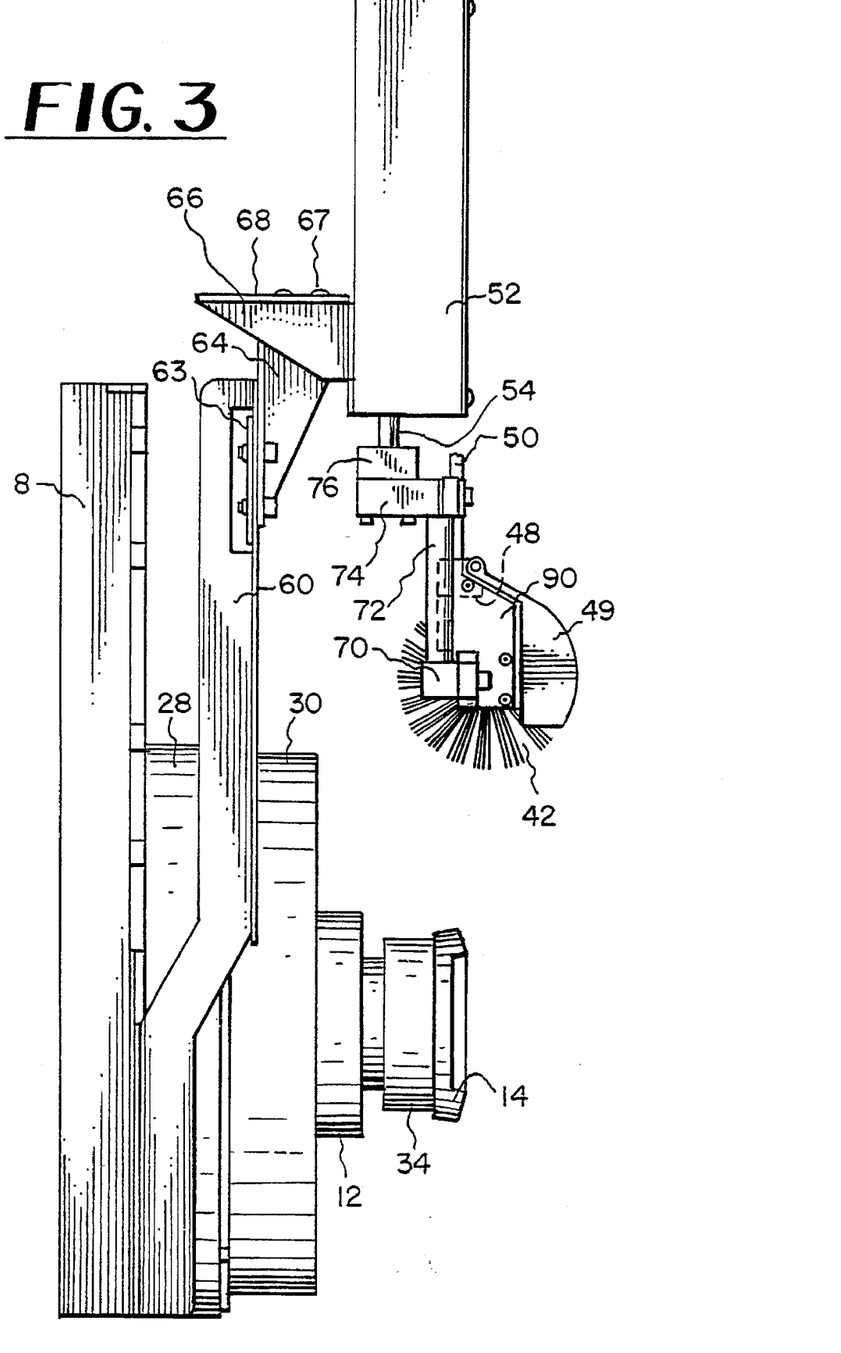
FIG. 3 is a side view of the marking compound application apparatus of the present invention the remote position.

Marking compound is applied to the tooth surfaces of gear member 14 by actuating piston 52 to move the brush from the remote position shown in FIG. 3 to the engaged working position shown in FIGS. 2 or 6. Prior to applying marking compound, rod 72 and/or mounting bracket 80 may be pivotally adjusted by loosening respective screws 75 and 71 and brackets 64 and 68 may be adjusted in respective slots 61 and 65 to position brush 42 in a manner where it will engage the tooth surfaces of gear member 14 upon being advanced to the working position of FIG. 3.

Once brush 42 is engaged with gear member 14, the gear member is rotated to effect rotation of brush 42 due to the presence of bristles 44 in the tooth slots of gear member 14. Preferably, brush 42 is positioned above (or below) a horizontal plane, with respect to the machine base 2, containing gear axis G. Marking compound is provided to supply manifold 48 and discharged at outlets 96 where the marking compound is picked up by bristles 44. Since only a small amount of marking compound is required to coat the tooth surfaces of a gear or pinion, it is not usually necessary to provide marking compound through outlets 96 for each gear being tested. Instead, marking compound may only need to be provided to brush 42 after two, three or more gears have been coated.

Rotation of brush 42 causes marking compound to be applied to the tooth surfaces of gear member 14. As an example, about five seconds or more, depending on the rotational velocity of the gear member (or pinion if it is being coated), is usually necessary to adequately coat the tooth surfaces. Of course, the above procedure applies marking compound to only one side (coast side or drive side) of the teeth of gear 14 and, therefore, the direction of rotation of the gear member 14 is reversed, and thus so to is the rotation of brush 42, to effect application of marking compound to the other side surface of the teeth.

The presence of cover plate 49 resting on bristles 44 enables marking compound to be spread over the inner surface of the cover and acts to more evenly distribute marking compound over the entire periphery of brush 42. Cover 49 also serves to prevent any marking compound from being thrown from bristles 44 onto machine components by centrifugal force caused by the rotation of brush 42.

Preferably, the initial direction of rotation of gear member 14 is selected to effect rotation of brush 42 in a direction from the manifold 48 toward cover plate 49. That is, a clockwise rotation of brush 42 as seen in FIG. 3. This enables marking compound picked up by bristles 44 from outlets 96 to immediately spread over the inner surface of cover plate 49, as mentioned above, and therefore quickly provides an even coating of marking compound over all bristles 44 which in turn allows all tooth surfaces (drive or coast side) of gear 14 to be coated evenly and quickly. Brush 42 may then be reversed to coat the other side surfaces of the teeth.

After the marking compound has been applied to the tooth surfaces, the rotation of gear member 14 is stopped. The piston 52 is actuated to retract marking compound assembly system 40 to the remote position as shown in FIG. 3. The gear member 14 may then engage pinion member 24 and the pair run in mesh to form contact "footprints" on the tooth surfaces of gear member 14. The contact characteristics of the gear set may then be evaluated and analyzed.

In gear testing, aside from tooth contact evaluations requiring marking compound as have been described above, there are other test procedures that may be conducted on gear testing machines. One of these tests is a roll test wherein the gear and pinion are rolled together under load to evaluate their running characteristics under conditions which correspond to actual operating conditions. In roll testing, a lubricant such as oil is applied to the gears as is the known practice. However, as the gears rotate, the centrifugal force due to the rotation results in oil being thrown from the gear set and onto various machine components. In this instance, there exists a risk of contaminating the brush 42 with the lubricating oil when the compound application system 40 is in the withdrawn position (FIG. 3).

Figure 8:
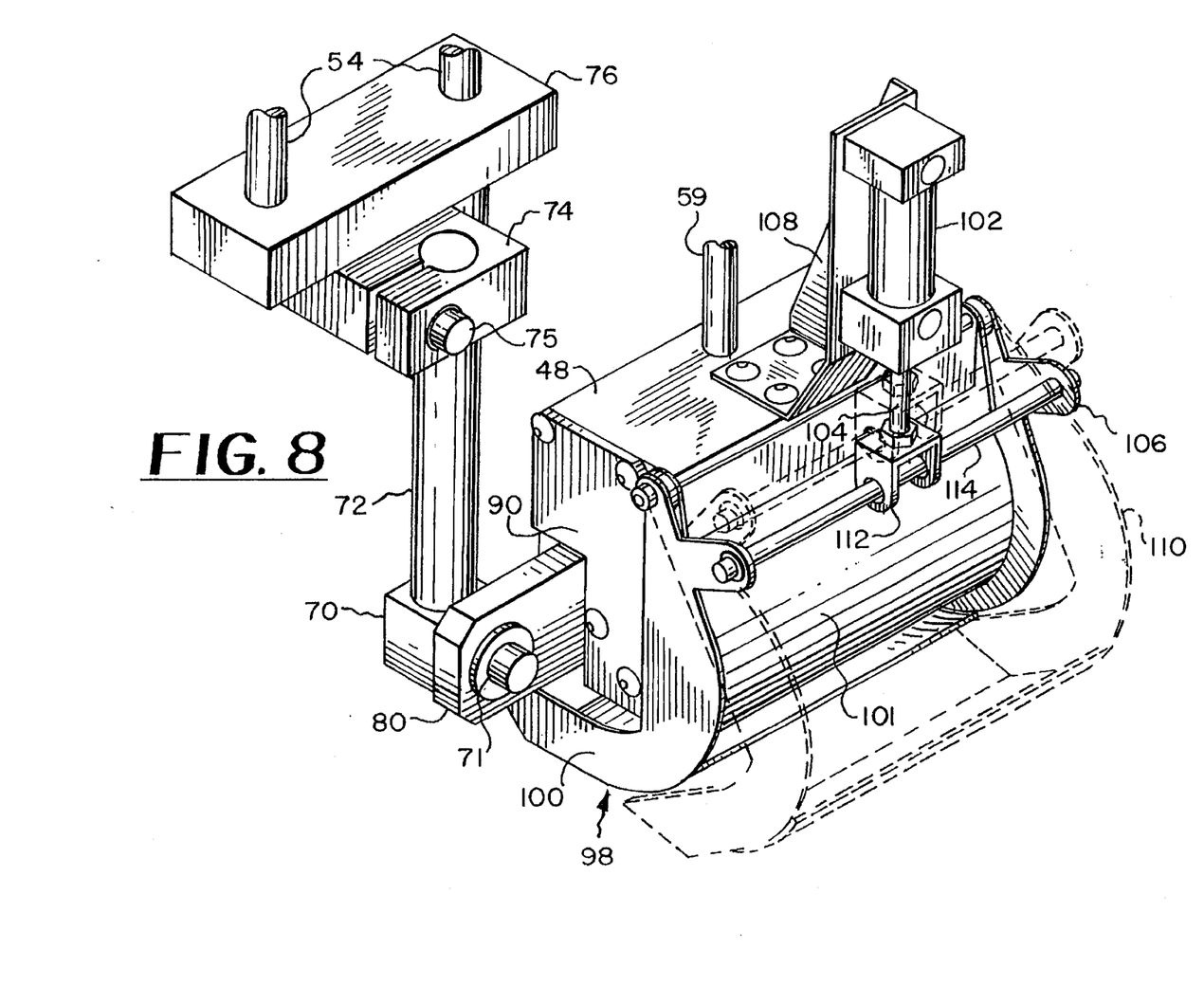
FIG. 8 illustrates an additional feature of the present invention comprising a cover for protecting the brush from contamination when in the remote position.
Figure 9:
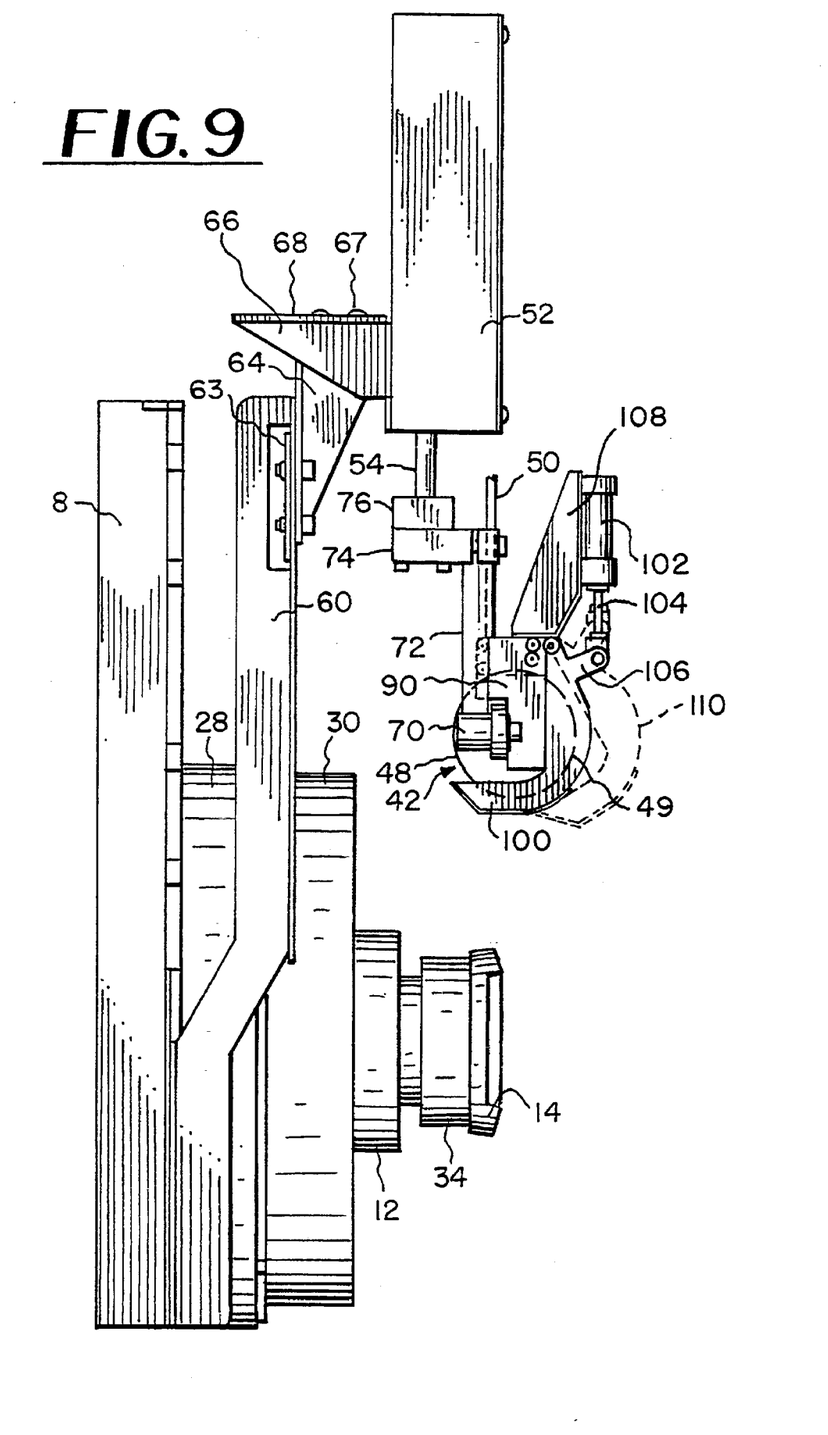
FIG. 9 is a side view of the marking compound application apparatus illustrating the additional cover shown in FIG. 8.

FIGS. 8 and 9 illustrate an additional embodiment of the present invention wherein the compound application system further comprises a splash guard 98 having end plates 100 and a cover 101. Splash guard 98 is movable via a cylinder 102, piston 104, bracket 112 and lifting rod 114 between a closed position, as shown by the solid lines, and an open position 110 shown by dashed lines. Lifting rod 114 extends through bracket 112 and between tabs 106 projecting from end plates 100. Cylinder 102 may be air or hydraulically actuated and is secured to manifold 48 by mounting bracket 108.

When the application system 40 is in the remote position (FIG. 9) and another test is to take place, such as a roll test using a lubricant, cylinder 102 is actuated to locate splash guard 98 in a protective position below brush 42 as shown by the solid lines in FIGS. 8 and 9 to shield brush 42 from any lubricant that is thrown from the gear set during testing. When the compound application system 40 is to be positioned in contact with a gear 14 or pinion (FIG. 2), cylinder 102 is activated to lift splash guard 98 to an open position shown by the dashed lines thus exposing brush 42 such that the brush may contact the gear 14 for applying marking compound.

With the present invention, contamination of the atmosphere by marking compound is eliminated since no marking compound is released into the air as occurs with spraying techniques. Also, the amount of compound used is reduced by the elimination of wasted compound associated with spraying.

The marking compound application apparatus of the present invention provides an automated method of coating tooth surfaces which provides even coatings and consistent gear-to-gear coatings which previously have not been attainable with spraying techniques or even by hand brushing.

With the brushing method of the present invention, marking compounds with carrier oils having higher viscosity than those oils used in spraying or hand brushing may be utilized. These thicker or "dry" marking compounds mix with residual oil on the tooth surfaces upon application with the brush 42 to form marking compound of the proper consistency. Thus, in many instances, the present invention eliminates the need to remove residual oil resulting from previous testing procedures from the tooth surfaces.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for applying marking compound to the tooth surfaces of a gear or pinion member, said apparatus comprising:

a brush having a central shaft and a plurality of bristles emanating from said shaft, said brush being rotatable about an axis of rotation coincident with said shaft, a marking compound manifold adjacent said brush, said manifold having an inlet in a first side thereof, an inner distribution chamber communicating with said inlet, and a plurality of outlets in a second side of said manifold communicating with said inner chamber, said outlets facing said bristles, wherein said brush is rotated by engaging said bristles with the tooth surfaces of said gear or pinion member and rotating said engaged gear or pinion member about its respective axis.

2. The apparatus of claim 1 including means to move said apparatus in a direction from a first position remote from said gear or pinion to a second position wherein said bristles engage said tooth surfaces of said gear or pinion.

3. The apparatus of claim 2 further comprising said brush and manifold being pivotably adjustable about an axis perpendicular to the axis of said gear or pinion.

4. The apparatus of claim 2 further comprising said brush and manifold being pivotably adjustable about an second axis parallel to said axis of said engaged gear or pinion member.

5. The apparatus of claim 1 further including a cover plate extending over a portion of the periphery of said brush.

6. The apparatus of claim 5 wherein the inside surface of said cover plate contacts said bristles whereby said brush sweeps across said inside surface.

7. The apparatus of claim 5 wherein said cover plate is hinged to said manifold.

8. The apparatus of claim 1 wherein said manifold is positioned proximate said brush such that upon rotation of said brush, said bristles will sweep across or adjacent to said outlets.

9. The apparatus of claim 1 wherein said outlets are arranged in said second side of said manifold such that said outlets extend in a direction substantially the same as said shaft of said brush.

10. The apparatus of claim 9 further including means in said manifold to prevent flow of marking compound through a portion of said outlets.

11. The apparatus of claim 2 further including means to shield said brush when in said remote position.

12. The apparatus of claim 11 wherein said means to shield comprises a splash guard movable from an open position when said apparatus engages a workpiece to a protective position when said apparatus is in said remote position, wherein said means provides a shield between said brush and said workpiece when in said protective position.

13. The apparatus of claim 1 wherein said outlets comprise diameters of different dimensions.

14. The apparatus of claim 1 wherein said outlets each have a diameter of about 0.050 inch.

15. A method of applying marking compound to tooth surfaces of a gear or pinion member, said method comprising:

providing a marking compound application apparatus, said apparatus comprising a rotatable brush positioned proximate to a marking compound manifold, said manifold having an inlet in a first side thereof, an inner distribution chamber communicating with said inlet, and a plurality of outlets in a second said of said manifold communicating with said inner chamber, said outlets facing said brush, moving said application apparatus from a remote position to an operating position relative to said gear or pinion to engage said brush with the tooth surfaces of said gear or pinion, rotating the engaged gear or pinion member about its axis to effect rotation of said brush, supplying marking compound to said outlets of said manifold whereby said compound is picked up by the rotating brush and applied to said tooth surfaces by the engagement of said rotating brush with said rotating gear or pinion member.

16. The method of claim 15 wherein said gear and pinion members are mounted on a machine tool having a machine base and wherein said moving said application apparatus comprises vertically displacing said apparatus, with respect to said machine base, from said remote position to said operating position.

17. The method of claim 15 wherein said operating position is located above or below a horizontal plane, with respect to said machine base, containing said axis of said engaged gear or pinion member.

18. The method of claim 15 wherein said compound application apparatus further comprises a cover plate having an inside surface and extending over a portion of the periphery of said brush, said inside surface contacting the periphery of said brush and wherein the rotating brush sweeps across said inside surface.

19. The method of claim 15 wherein said compound application system further includes a shield means for said brush, said shield means being moved to an open position when said system is in said operating position and to a protective position when said system is in said remote position, said protective position providing a shield between said brush and said gear or pinion.

* * * * *